(12) United States Patent
Probst

(10) Patent No.: US 8,418,598 B2
(45) Date of Patent: Apr. 16, 2013

(54) DRIVING DEVICE

(75) Inventor: Ulrich Probst, Hillscheid (DE)

(73) Assignee: Stabilus GmbH, Koblenz (DE)

( * ) Notice: Subject to any disclaimer, the term of this patent is extended or adjusted under 35 U.S.C. 154(b) by 1093 days.

(21) Appl. No.: 12/388,553

(22) Filed: Feb. 19, 2009

(65) Prior Publication Data

US 2009/0206531 A1 Aug. 20, 2009

(30) Foreign Application Priority Data

Feb. 20, 2008 (DE) .......................... 10 2008 010 249

(51) Int. Cl.
*F01B 7/20* (2006.01)

(52) U.S. Cl.
USPC ................................. 91/169; 92/52

(58) Field of Classification Search ................ 91/167 R, 91/169; 92/52, 110, 143
See application file for complete search history.

(56) References Cited

U.S. PATENT DOCUMENTS

| | | | | |
|---|---|---|---|---|
| 3,399,603 A | * | 9/1968 | Cagle | 92/110 |
| 3,436,048 A | * | 4/1969 | Greer | 248/397 |
| 3,592,108 A | * | 7/1971 | Rosaen et al. | 92/110 |
| 4,877,222 A | * | 10/1989 | Davis | 92/9 |
| 6,272,853 B1 | * | 8/2001 | Broechmann | 92/52 |
| 6,600,285 B2 | | 7/2003 | Mintgen et al. | |
| 6,675,698 B1 | * | 1/2004 | Shteynberg | 92/143 |
| 7,823,803 B2 | * | 11/2010 | Peterson et al. | 92/52 |
| 2007/0062119 A1 | | 3/2007 | Ritter | |

* cited by examiner

*Primary Examiner* — Michael Leslie
(74) *Attorney, Agent, or Firm* — Cozen O'Connor

(57) ABSTRACT

A driving device for pivoting a flap with respect to a body includes a cylindrical pressure tube having a closed first end and a second end with a seal, a piston dividing the pressure tube into a first working chamber and a second working chamber, a piston rod extending through the first working chamber and the seal, a gas under pressure in the first and second working chambers, and a sealing and guiding cap fixed to the second end of the pressure tube. An outer tube has a closed first end and an open second end which receives the pressure tube in a telescoping manner, thereby forming a third working chamber between the second end of the pressure tube and the first end of the outer tube, wherein a fluid can be conveyed into and out of the third working chamber.

17 Claims, 5 Drawing Sheets

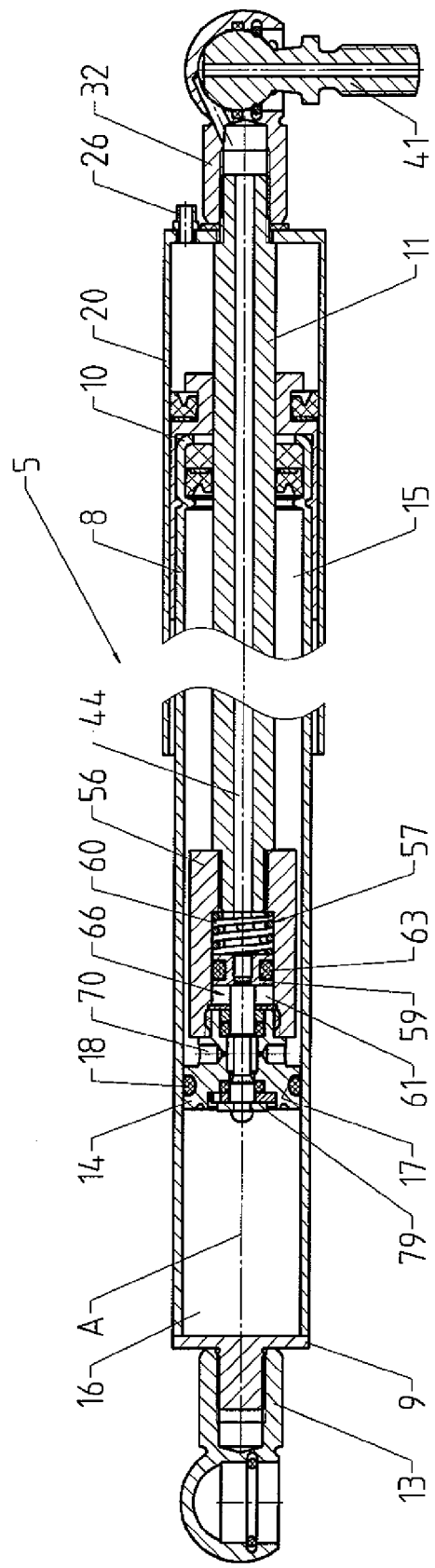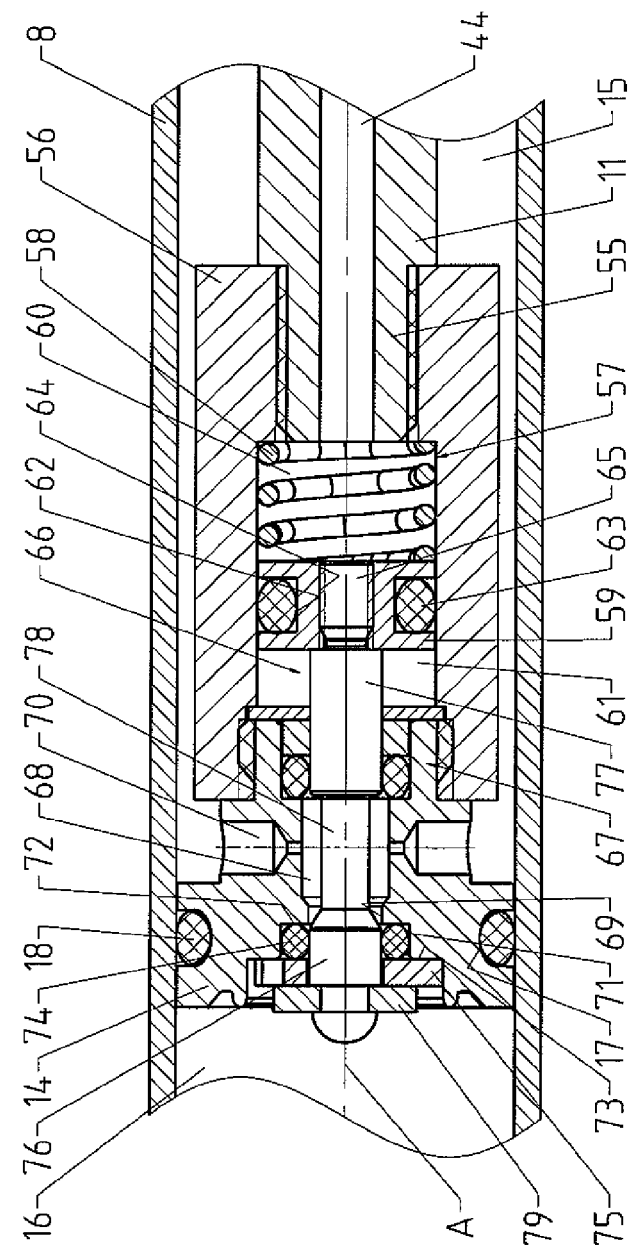
Fig 5
Fig 6

DRIVING DEVICE

BACKGROUND OF THE INVENTION

1. Field of the Invention

The invention is directed to a driving device, particularly for a hatch in a vehicle.

2. Description of the Related Art

There is a wide variety of known driving devices for moving vehicle hatches. For example, U.S. Pat. No. 6,600,285 shows a driving device with a Bowden cable system and a direct drive for opening and closing a vehicle hatch in which an electric motor with a gear unit and clutch is used.

Further, US2007/0062119 discloses a driving device in which a spindle drive brings about automatic closing and opening by means of a motor with a gear unit and a clutch.

Drives of the kind mentioned above are very complicated with respect to construction and accordingly entail relatively high manufacturing costs.

SUMMARY OF THE INVENTION

Therefore, it is an object of the invention to provide a driving device for hatches which is constructed in a simple manner, is easy to assemble and is economical to produce.

According to the invention, in that the driving device includes a gas spring having a cylindrical pressure tube which is closed at a first end and in which a piston is arranged so as to be displaceable. The piston divides the pressure tube into a first work chamber and a second work chamber and has a piston rod which penetrates the first work chamber and is guided out at a second end of the pressure tube, with a gas filling of the first work chamber and second work chamber which is under pressure and through which the piston is acted upon by a push-out force. The piston rod passes through a sealing and guiding cap with sealing ring arranged at the second end of the pressure tube and an outer tube which is closed at a first end by a bottom and in which the gas spring is arranged in a telescoping manner, wherein a fluid can be conveyed into or out of the interior of the outer tube.

In a further development, a pressure connection device by which the fluid can be conveyed into or out of the outer tube is arranged at the bottom.

Alternatively, a threaded pin is formed at the end of the piston rod located opposite to the piston, an axial bore hole extends through the threaded pin and opens into a radial bore hole communicating with the interior of the outer tube, the fluid can be conveyed into or out of the outer tube through this radial bore hole.

In a further development, the threaded pin is guided out of the outer tube through an opening in the bottom.

To fasten the driving device to a base part and to a structural component part which is swivelable relative to the base part, a first connection element is arranged at the first end of the pressure tube and a second connection element is arranged on the threaded pin outside the outer tube.

A sealing element is advantageously arranged between the second connection element and the bottom of the outer tube so that the fluid cannot flow out of the pressure system in an uncontrolled manner.

The sealing element is constructed as an 0-ring seal which is arranged in an inset in the second connection element.

Alternatively, the sealing element is constructed as an annular disk seal, in which case the widened diameter can be omitted so that a more economical production of the connection element is possible.

To connect the second connection element to the piston rod, a threaded pin is formed at the end of the piston rod located opposite to the piston. Alternatively, an adapter piece with an internal thread may be screwed on the threaded pin.

Owing to the use of the adapter piece, a standard, mass-produced piston rod may be used and the adapter piece can be produced independent from the production of the piston rod.

In a further development, the adapter piece has a threaded pin at the end located axially opposite to the internal thread, an axial bore hole extends through the threaded pin and opens into a radial bore hole communicating with the interior of the outer tube, the fluid can be conveyed into or out of the outer tube through this radial bore hole.

The threaded pin is guided out of the outer tube through the opening in the bottom, and the second connection element is screwed onto the threaded pin of the piston rod or onto the threaded pin of the adapter piece with a first receiving chamber which is formed in a fastening shaft and has, at least partially, an internal thread.

In an advantageous manner, the first receiving chamber is connected by an overflow channel to a second receiving chamber having an area shaped like a spherical segment.

The second receiving chamber has a first groove for receiving a locking ring by which a head of a ball-head pin is held in the second receiving chamber so as to be swivel able.

Further, the second receiving chamber has a second groove for receiving a sealing element to provide a preferably gastight connection between the second connection element and the head of the ball-head pin.

In a further development, a through-hole extends through the ball-head pin.

In order to connect the ball-head pin to a pressure generating unit, a pressure connection is provided at the side of the ball-head pin located opposite to the head.

In another embodiment form of the invention, the piston comprises a switching valve to block the gas spring.

In another construction, the switching valve has a valve pin.

The valve pin comprises at one end a small piston which is arranged in a chamber connected to the axial bore hole in the piston rod.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 5 shows a section through a fourth embodiment form according to the invention;

FIG. 6 shows a detailed view of the embodiment form shown in FIG. 5.

DETAILED DESCRIPTION OF THE PRESENTLY PREFERRED EMBODIMENTS

Figure 1:
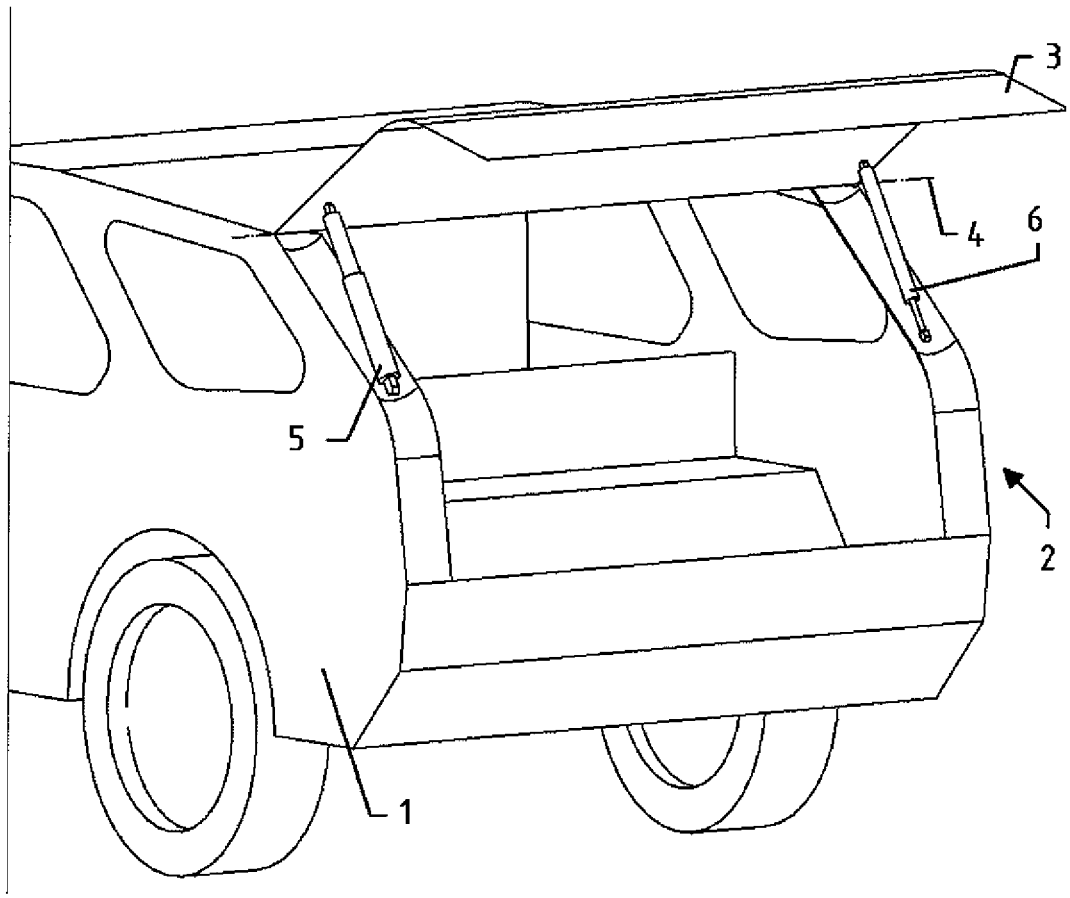
FIG. 1 shows a schematic view of a motor vehicle with a pivotably driven hatchback.

FIG. 1 is a schematic view of a motor vehicle with a body as a base part 1 and a movable part which closes or opens an opening 2 in the base part 1 and which is constructed as a hatchback, hereinafter referred to as a hatch 3. The hatch 3 can also be a front hood or engine hood, a vehicle door or a corresponding application.

The hatch 3 is mounted in a horizontal swiveling axis 4 extending transverse to the vehicle. A first driving device 5 is arranged at one side of the hatch 3 and a second driving device 6 is arranged at the opposite side of the hatch 3. It is possible for one of the two driving devices 5 and 6, or both, to be formed by the driving device described in the following. If only one of the two driving devices 5 or 6 comprises the driving device according to the invention, the other driving device is preferably formed by a commercially available gas spring which counterbalances a substantial portion of the weight force of the hatch.

Figure 2:
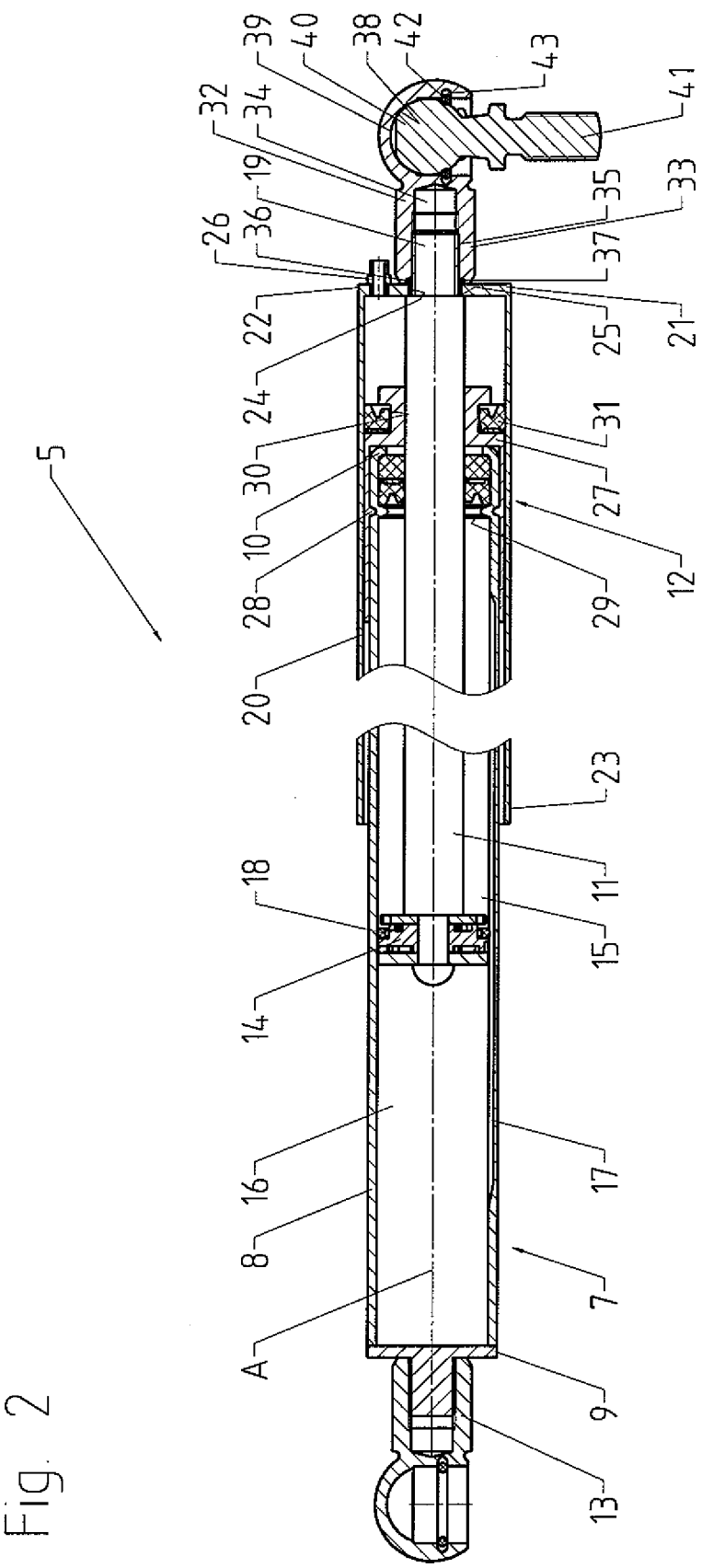
FIG. 2 shows a section through a first embodiment form of the driving device according to the invention.

The embodiment form of the driving device 5 shown in FIG. 2 includes a gas spring 7 with a center longitudinal axis A, a pressure tube 8 with a closed first end 9 and an open second end 10 located opposite to the closed end 9. A piston rod 11 is guided out of the pressure tube 8 through a sealing and guiding package 12 in the second end 10 in coaxial arrangement relative to the pressure tube 8 and to the center longitudinal axis A. A first connection element 13 is arranged at the closed end 9 of the pressure tube 8. The connection element 13 is preferably formed as a ball socket. The connection element 13 can also be constructed as a knuckle eye or the like.

A piston 14 divides the pressure tube 8 into a first work chamber 15, through which the piston rod 11 extends, and a second work chamber 16. To allow the gas which is under pressure in the pressure tube 8 to flow from one work chamber to the other, overflow devices already known for gas springs can be provided. For example, a groove 17 extending in axial direction can be provided in the pressure tube 8 and/or a piston ring 18 under which flow can occur. A threaded pin 19 with a smaller outer diameter is formed at the end of the piston rod 11 located outside the pressure tube 8.

The driving device 5 further includes an outer tube 20 with a first end 22 which is closed by a bottom 21 and with an open second end 23 located opposite to the first end 22. The gas spring 7 is inserted into the outer tube 20 by its first end 10, and the threaded pin 19 of the piston rod 11 is guided through an opening 24 which is arranged in the bottom 21 of the outer tube 20 coaxial to the center longitudinal axis A. In doing so, the piston rod 11 contacts the bottom 21 in the interior of the outer tube 20 by a shoulder 25 formed by the transition from the piston rod 11 to the threaded pin 19 having a smaller outer diameter.

Further, a pressure connection device 26 which is connected to a pressure generating unit, not shown, is arranged off center in the bottom 21. A fluid is conveyed into or out of a third working chamber inside the outer tube 20 via the pressure connection device 26. A sealing and guiding cap 27 is arranged over the second end 10 of the gas spring 7 so that the fluid conveyed into the interior of the outer tube 20 cannot escape from the second end 23. The sealing and guiding cap 27 fits on the second end 10 of pressure tube 8 with a press fit or has at least one projection 28 which engages in a recess 29 formed in the pressure tube 8. The recess 29 can be formed as a circumferential groove or as one or more discrete recesses.

The sealing and guiding cap 27 has a circumferential channel 30, and a sealing ring 31 which seals against the outer tube 20 inserted into the channel 30. A second connection element 32 with a fastening shaft 33 having a first receiving chamber 34 with an internal thread 35 is screwed onto the threaded pin 19 projecting through the opening 24. An inset 36 in which an 0-ring-shaped sealing element 37 is inserted is formed at the open end of the first receiving chamber 34 facing the bottom 21. Further, the second connection element 32 has a second receiving chamber 38 which has a spherical socket portion 39 that receives a ball head 40 of a ball-head pin 41 so as to be pivotably movable. The head 40 has a flattened portion in the socket portion 39 and is held in the socket portion 39 by means of a locking ring 42 arranged in a circumferential groove 43 in the second receiving chamber 38.

The pressure in the gas spring 7 is selected so that the push-out force acting on the hatch 3 is somewhat less than the weight force of the hatch 3 acting in the closing direction. When a fluid is permitted to flow into the outer tube 20 via the pressure connection device 26, the sealing and guiding cap 27 is moved toward the second end 23 of the outer tube 20 and the second end 10 of the pressure tube 8 is moved toward the piston 14 together with the sealing and guiding device 12. The position of the piston 14, relative to second end 23, does not change. The gas spring 7 accordingly moves out. Since most of the weight force of the hatch 3 is counterbalanced by the gas spring, only a very small pressure is needed in the outer tube 20 to move the hatch 3 into a completely open or partially open position. The pressure can be approximately 10 bar or less. A pressure of about 4 bar is preferable.

When the pressure in the outer tube 20 is reduced again in order to close the hatch 3, the sealing and guiding cap 27, together with the second end 10 of the pressure tube 8, is moved in direction of the bottom 21 by the weight force of the hatch 3. The gas spring accordingly moves in.

Figure 3:
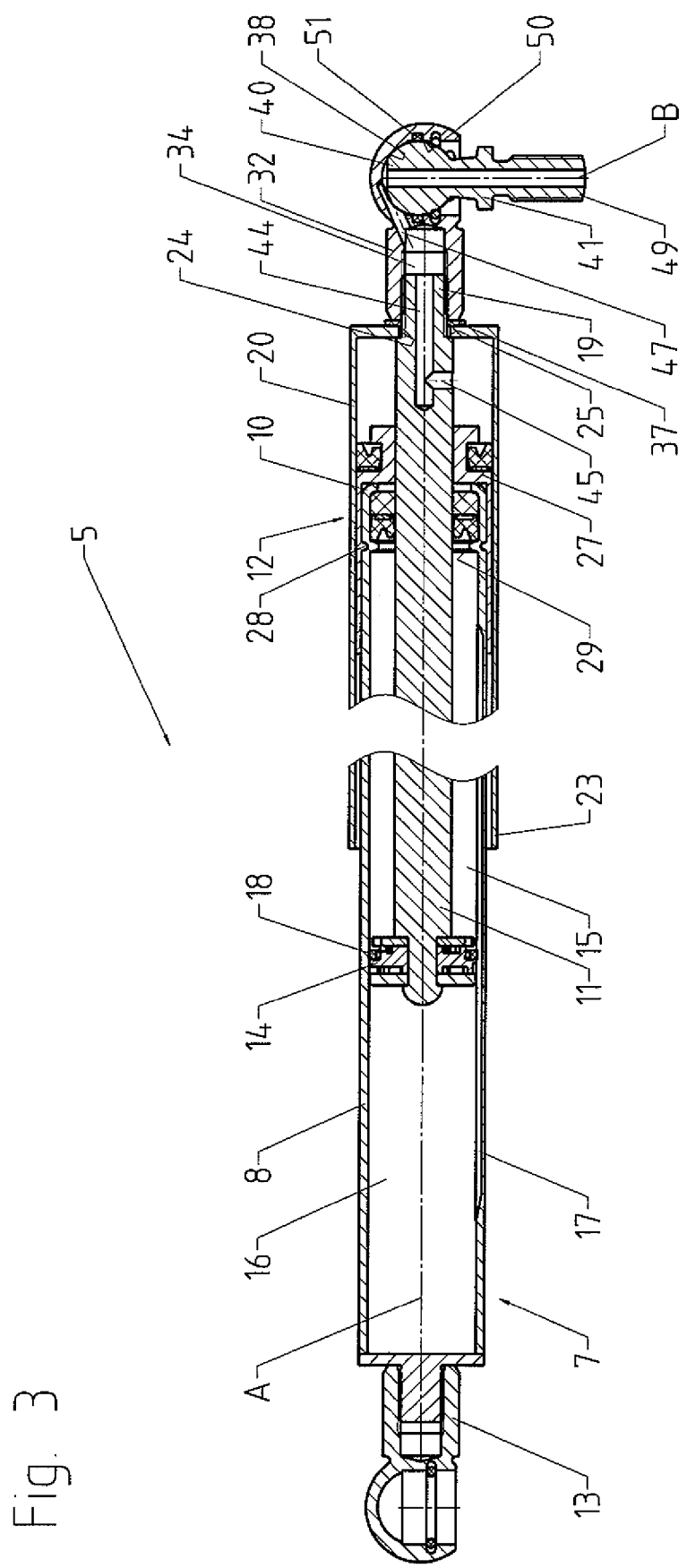
FIG. 3 shows a section through a second embodiment form according to the invention.

FIG. 3 shows a second embodiment form of the invention. In this case, the pressure connection device 26 in the bottom 21 of the outer tube shown in FIG. 2 is omitted. Instead, the fluid is conveyed into or out of the interior of the outer tube 20 via an axial bore hole 44 formed coaxial to the center longitudinal axis A. The axial bore hole 44 extends from the end of the piston rod 11 located outside of the pressure tube 8 through the threaded pin 19 and opens into a radial bore hole 45 communicating with the interior of the outer tube 20. Further, the sealing element 37 is formed as a sealing disk so that the widened diameter 36 shown in FIG. 2 can be dispensed with.

In order to convey the fluid through the axial bore hole 38 and radial bore hole 39 in a simple manner without a hose always having to be moved along with it, the second connection element 32 has an overflow channel 47 which connects the first receiving chamber 34 to the second receiving chamber 38. The ball-head pin 41 has a through-hole 48 which extends from the flattened portion in the ball head 40 substantially coaxial to the center longitudinal axis B of the ball-head pin 41 to the oppositely located end 49 of the ball-head pin 41. The end 49 of the ball-head pin is preferably connected to the base part 1 and to a pressure connection device which is not shown in this case.

In order to prevent the fluid from escaping from the second receiving chamber 38 in an uncontrolled manner, a circumferentially extending groove 50 is arranged in the second receiving chamber 38 at half the height of the equator of the head 40 and an O-ring sealing element 51 is seated in this groove 50.

Figure 4:
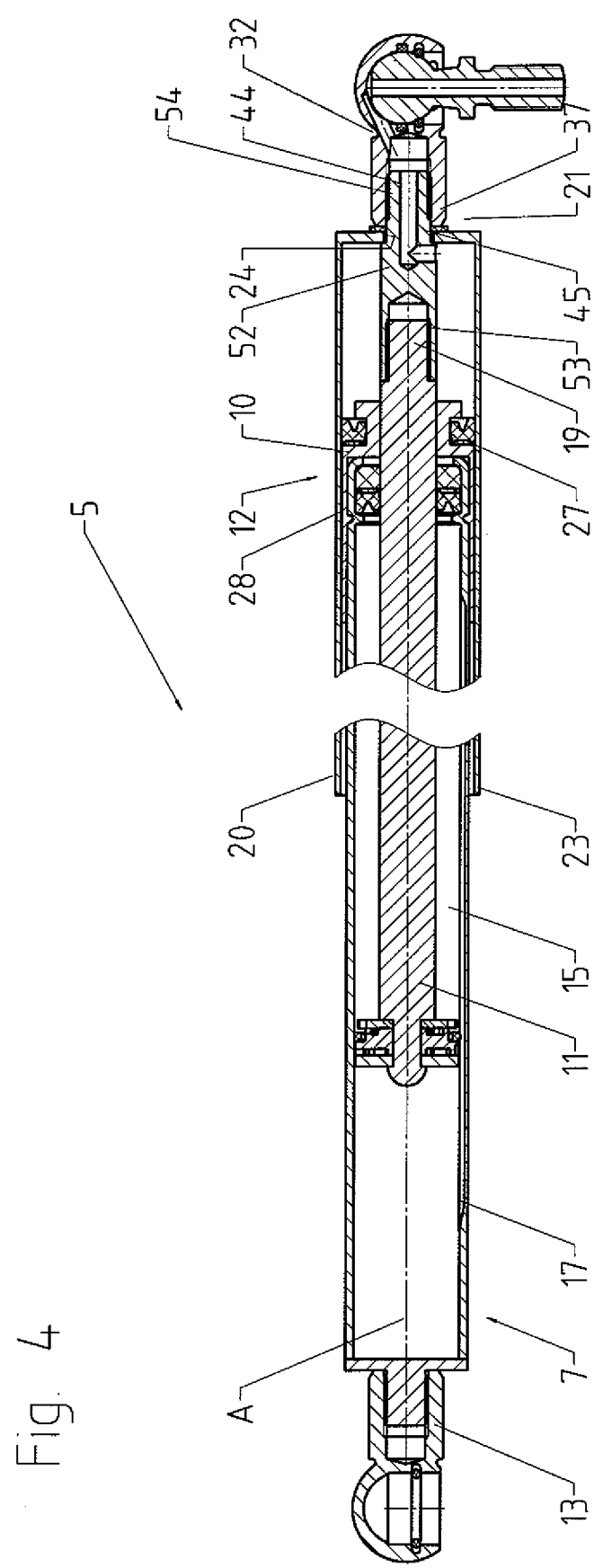
FIG. 4 shows a section through a third embodiment form according to the invention.

FIG. 4 shows a third embodiment form of the driving device 5 according to the invention. An adapter piece 52 with an internal thread 53 is screwed onto the threaded pin 19 of the piston rod 11. The adapter piece 52 has at the side opposite to the internal thread 53 a threaded pin 54 with a smaller diameter which, in the same way as the threaded pin 19 described in FIG. 3, is guided through the opening 24 in the bottom 21 of the outer tube 20 and connected to the second connection element 32 so as to be sealed by the sealing element 37.

The axial bore hole 44 is formed in the adapter piece 52 and extends from the end of the adapter piece 52 located outside of the outer tube 20 through the threaded pin 54 and opens into the radial bore hole 45 communicating with the interior of the outer tube 20. The adapter piece 52 can be produced from a metal material or can be made of plastic, which further simplifies production.

Owing to the use of the adapter piece 52, a standard, mass-produced piston rod 11 may be used. Further, the adapter piece 52 can be produced independent from the production of the piston rod.

FIGS. 5 and 6 show a fourth embodiment form of the driving device 5 according to the invention. FIG. 6 is a detailed view of the driving device 5 shown in FIG. 5.

In contrast to the other embodiment forms, no flow occurs under the piston ring 18 in the groove 17 of the piston 14, and the axial bore hole 44 extends coaxial to the center longitudinal axis A through the same piston rod 11 so that a switching valve arranged in the piston 14 can be actuated. A threaded pin 55 is formed at the end of the piston rod 11 located in the gas spring 7. A sleeve 56 with internal threads in both ends is screwed onto this threaded pin 55. The piston 14 is screwed into the end opposite the piston rod 11. The two internal threads of the sleeve 56 extend into the latter only as far as is necessary to screw the piston rod 11 and the piston 14 securely to the sleeve 56. A chamber 57 is formed between the areas with the internal threads. A spring element 58 supported substantially at the end of the piston rod 11 is arranged in this chamber 57.

A small piston 59 which divides the chamber 57 into a first partial chamber 60 and a second partial chamber 61 contacts the end of the spring element remote of the piston rod 11, the spring element 58 being arranged in the first partial chamber 60. The small piston 59 has a groove 62 on its radially circumferential outer surface, a sealing ring 63 being inserted into this groove 62. A bore hole 64 with an internal thread is formed coaxial to the center longitudinal axis A, and a threaded plug 65 of a valve pin 66 is screwed into this bore hole 64. The small piston 59 is constructed so that the fluid flowing into the axial bore hole 44 and the first partial chamber 60 cannot flow into the second partial chamber 61.

For reasons of safety, a sealing ring, not shown, can be arranged at the valve pin 66 in such a way that it prevents fluid from flowing through between the bore hole 64 and the threaded plug 65 if this is not already provided for by the structural component parts themselves.

The valve pin 66 is guided coaxial to the center longitudinal axis A in a piston chamber 68 in the piston 14 so as to be sealed by means of a sealing and guiding device 67. The piston chamber 68 is connected to the second work chamber 16 by a coaxial connection opening 69 and to the first work chamber 15 by at least one radial connection opening 70. An annular chamber 71 with two annular shoulders 72 and 73 arranged at a distance from one another is formed in the area of the coaxial connection opening 69. Arranged in the annular chamber 71 is a sealing ring 74 which tightly contacts the cylindrical wall of the piston chamber 68 by its radial circumferential outer surface. The sealing ring 74 is fixed axially to an annular disk 75 contacting the shoulder 73 between the annular shoulder 72 and the annular disk 75.

The cylindrical valve pin 66 has end regions 76 and 77 and a central area 78 of reduced diameter therebetween.

A radial widening formed by a disk 79 at the end of the valve pin 66 facing the second work chamber 16 forms a stop which limits the sliding-in movement of the valve pin 66 into the piston 14.

In order to open the hatch 3, pressure must be applied to the small piston 59 by fluid via the axial bore hole 44. In so doing, the small piston 59 is moved axially in direction of the second work chamber 16, and the end area 76 of the valve pin 66 is lifted from the sealing ring 74. The fluid contained in the gas spring 7 can flow from the first work chamber 15 into the second work chamber 16 via the radial connection opening 70 and the coaxial connection opening 69 when a fluid is conveyed into the outer tube via the pressure connection device 26.

When the pressure of the fluid in the axial bore hole decreases again, the small piston 59 moves back into its initial position again and the end region 76 of the valve pin 66 tightly contacts the sealing ring 74. The gas spring 7 is accordingly blocked and a movement of the hatch 3 is no longer possible.

To close the hatch 3, the small piston 59 must be acted upon again by the fluid and the fluid must be moved out into the interior of the outer tube 20.

In order to deactivate the switching valve within certain ranges, one or more grooves 17, as shown in FIGS. 2 to 4, can be provided in the pressure tube 8.

In all of the embodiment examples, the fluid conveyed into or out of the interior of the outer tube 20 can be air generated by a compressor, or a liquid medium such as hydraulic oil. This may be controlled by means of sliders or proportional valves. The speed during opening and closing can also be regulated by means of the latter. Any variations in the force of the gas spring 7 that may be caused by temperature fluctuations can be compensated in this system by the proportional valve with the help of a temperature gauge. Further, a spring element, for example, a helical pressure spring, supporting the push-out movement of the gas spring can also be arranged in the outer tube.

Further, a valve can be provided in the system for emergency operation so as to open in case the system pressure noticeably exceeds the operating pressure. This overpressure can occur, for example, when the hatchback 3 is opened or closed manually. Further, a throttle can be integrated in the system, for example, at the pressure connection device, so as to limit the throughflow quantity.

Particularly in the embodiment form shown in FIGS. 5 and 6, the groove 17 in the piston 14 can have cutouts, not shown, through which the piston ring 18 can deform when a defined pressure on the piston ring 18 is exceeded and a flow path can be opened between the inner wall of the pressure tube 8 and the piston 14.

The invention is not limited by the embodiments described above which are presented as examples only but can be modified in various ways within the scope of protection defined by the appended patent claims.

I claim:

1. A driving device for pivoting a flap with respect to a body, the device comprising:
   a cylindrical pressure tube having a closed first end and a second end with a seal;
   a piston axially movable in the pressure tube, the piston dividing the pressure tube into a first working chamber and a second working chamber;
   a piston rod connected to the piston and extending through the first working chamber and the seal;
   a gas under pressure in the first and second working chambers;
   a sealing and guiding cap fixed to the second end of the pressure tube, the cap carrying a radially outward facing sealing ring;
   an outer tube having a closed first end and an open second end which receives the pressure tube in a telescoping manner, thereby forming a third working chamber between the second end of the pressure tube and the first end of the outer tube, the piston rod being fixed to the closed first end of the outer tube; and a conveyor for conveying a fluid into and out of the third working chamber, wherein the piston rod has an end opposite from the piston formed with a threaded pin extending through the first end of the outer tube, the conveyor for conveying a fluid comprising an axial bore in the threaded pin, the axial bore communicating with the third working chamber.

2. The driving device of claim 1 further comprising a first connection element fixed to the first end of the pressure tube, and a second connection element screwed onto the threaded pin at the first end of the outer tube.

3. The driving device of claim 2 further comprising a sealing element arranged between the second connection element and the first end of the outer tube.

4. The driving device of claim 3 wherein the second connection element is provided with an inset surrounding the threaded pin, the sealing element being received in the inset.

5. The driving device of claim 3 wherein the sealing element is an annular disk.

6. A driving device for pivoting a flap with respect to a body, the device comprising:
   a cylindrical pressure tube having a closed first end and a second end with a seal;
   a piston axially movable in the pressure tube, the piston dividing the pressure tube into a first working chamber and a second working chamber;
   a piston rod connected to the piston and extending through the first working chamber and the seal;
   a gas under pressure in the first and second working chambers;
   a sealing and guiding cap fixed to the second end of the pressure tube, the cap carrying a radially outward facing sealing ring;
   a outer tube having a closed first end and an open second end which receives the pressure tube in a telescoping manner, thereby forming a third working chamber between the second end of the pressure tube and the first end of the outer tube, the piston rod being fixed to the closed first end of the outer tube; and
   a conveyor for conveying a fluid into and out of the third working chamber,
   wherein the piston rod has an end opposite from the piston formed with a threaded pin, the driving device further comprising an adaptor piece screwed onto the treaded pin and fixed to the closed first end of the outer tube.

7. The driving device of claim 6 wherein the adaptor piece is formed with a threaded pin extending through the first end of the outer tube, the conveyor for conveying a fluid comprising an axial bore in the threaded pin formed on the adaptor piece, the axial bore communicating with the third working chamber.

8. A driving device for pivoting a flap with respect to a body, the device comprising:
   a cylindrical pressure tube having a closed first end and a second end with a seal;
   a piston axially movable in the pressure tube, the piston dividing the pressure tube into a first working chamber and a second working chamber;
   a piston rod connected to the piston and extending through the first working chamber and the seal;
   a gas under pressure in the first and second working chambers;
   a sealing and guiding cap fixed to the second end of the pressure tube, the cap carrying a radially outward facing sealing ring;
   an outer tube having a closed first end and an open second end which receives the pressure tube in a telescoping manner, thereby forming a third working chamber between the second end of the pressure tube and the first end of the outer tube, the piston rod being fixed to the closed first end of the outer tube;
   a conveyor for conveying a fluid into and out of the third working chamber; and
   a connection element fixed to the first end of the outer tube, the connection element having a fastening shaft with an internally threaded first receiving chamber for receiving a threaded pin.

9. The driving device of claim 8 wherein the connection element further comprises a second receiving chamber having a spherical socket portion, and an overflow channel connecting the first and second receiving chambers.

10. The driving device of claim 9, wherein the second receiving chamber comprises a first groove for receiving a locking ring for retaining a ball head in the spherical socket portion.

11. The driving device of claim 10, wherein the second receiving chamber further comprises a second groove, in the spherical socket portion, for receiving a sealing element.

12. The driving device of claim 9 further comprising a ball head pin having a ball head received in the socket portion, the ball head pin having a through hole for conveying fluid.

13. A driving device for pivoting a flap with respect to a body, the device comprising:
   a cylindrical pressure tube having a closed first end and a second end with a seal;
   a piston axially movable in the pressure tube, the piston dividing the pressure tube into a first working chamber and a second working chamber;
   a piston rod connected to the piston and extending through the first working chamber and the seal;
   a gas under pressure in the first and second working chambers;
   a sealing and guiding cap fixed to the second end of the pressure tube, the cap carrying a radially outward facing sealing ring;
   an outer tube having a closed first end and an open second end which receives the pressure tube in a telescoping manner, thereby forming a third working chamber between the second end of the pressure tube and the first end of the outer tube, the piston rod being fixed to the closed first end of the outer tube; and
   a conveyor for conveying a fluid into and out of the third working chamber,
   wherein the piston comprises a switching valve.

14. The driving device of claim 13 wherein the switching valve comprises a valve pin which is movable in the piston.

15. The driving device of claim 14 wherein the switching valve further comprises a small piston fixed to the valve pin and movable relative to the piston rod.

16. The driving device of claim 15 wherein the small piston is received in a chamber connected to an axial bore through the piston rod.

17. The driving device of claim 13 wherein the conveyor for conveying a fluid comprises a pressure connection in the first end of the outer tube.

* * * * *